United States Patent [19]

Behrens

[11] 3,833,232
[45] Sept. 3, 1974

[54] CHUCK JAW INSERT ASSEMBLY
[75] Inventor: Alvin J. Behrens, Kent, Wash.
[73] Assignee: The Cleveland Twist Drill Company, Cleveland, Ohio
[22] Filed: June 23, 1972
[21] Appl. No.: 265,761

Related U.S. Application Data
[63] Continuation-in-part of Ser. No. 45,499, June 11, 1970, Pat. No. 3,679,221.

[52] U.S. Cl. ............................... 279/123, 279/1 SJ
[51] Int. Cl. ............................................. B23b 31/10
[58] Field of Search......... 279/123, 1 SJ, 1 ME, 110

[56] References Cited
UNITED STATES PATENTS
2,757,008   7/1956   Lane ............................ 279/123 X
3,190,666   6/1965   Testa ............................. 279/123
3,248,121   4/1966   Volpe ........................... 279/123 X
3,322,434   5/1967   McCluny et al. ............. 279/123

Primary Examiner—Andrew R. Juhasz
Assistant Examiner—Z. R. Bilinsky
Attorney, Agent, or Firm—Bosworth, Sessions & McCoy

[57] ABSTRACT

A top jaw and insert for use in connection with chucks of turning machines, or latches, are disclosed. Each insert is held in a recess in a top jaw and precisely positioned relative to said top jaw by: the outer end portion of the sidewalls forming the recess are precisely machined to provide parallel sidewall surfaces; additional mounting surfaces are provided on the opposite end portions of said sidewalls and located normal to the sidewall surfaces; an insert is provided with sidewalls to slidingly fit into said recess; the insert is provided with a head of a size to arrest further movement therepast of the insert into the recess; a machined under surface is provided on said head to mate with the surfaces at the end of the sidewalls; and set screws are threadingly mounted into said sidewalls, engage grooves in the insert, and upon rotation thereof, the set screws urge the insert and the machined surface thereof, on the underside of the head thereof, against the base surfaces and on the sidewall. Also, each of the sidewalls of the top jaws has mounting surfaces at each end portion thereof so that the insert can be carried by either end portion of the sidewall and carried by the top jaw.

5 Claims, 4 Drawing Figures

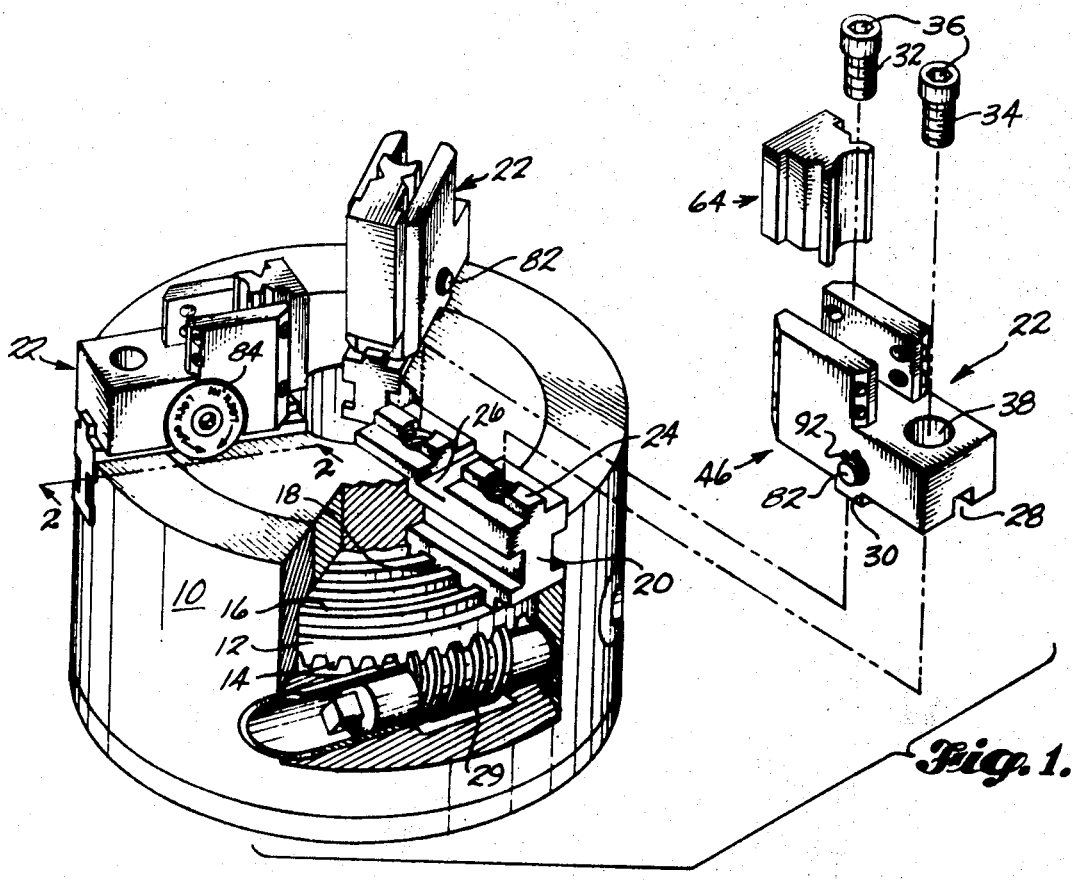
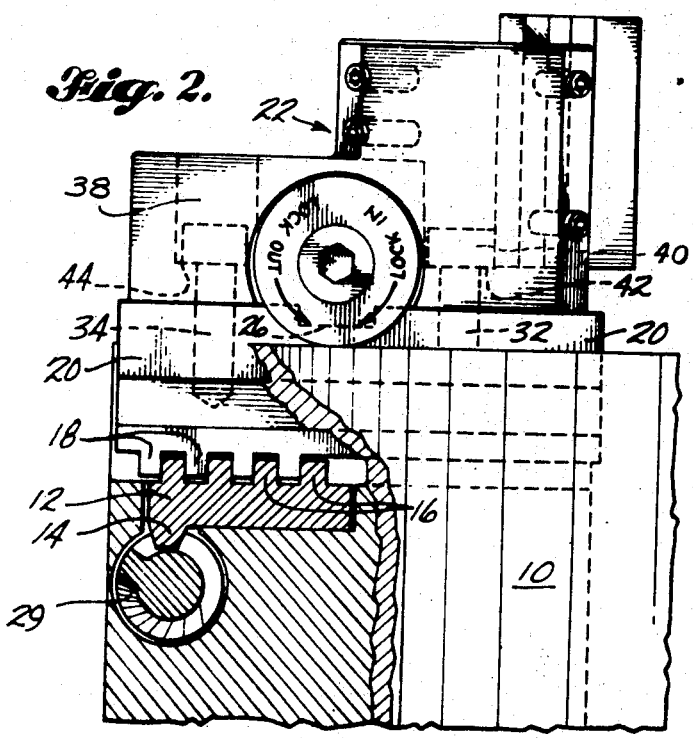

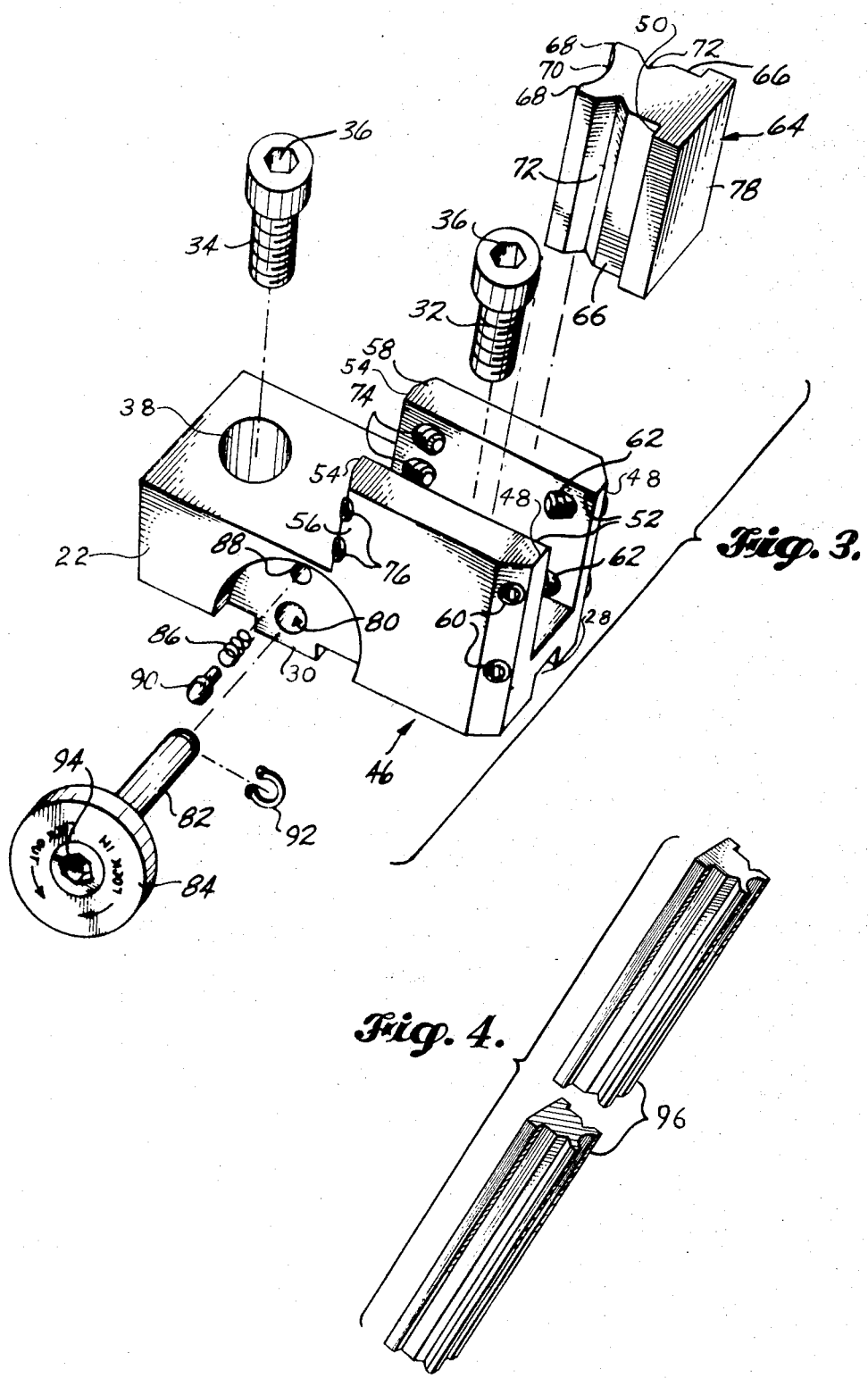

CHUCK JAW INSERT ASSEMBLY

CROSS REFERENCE TO RELATED APPLICATIONS

This is a continuation-in-part of my copending application Ser. No. 45,499, filed June 11, 1970, allowed Feb. 16, 1972, now U.S. Pat. No. 3,679,221, and hereinafter referred to as my said patent.

BACKGROUND OF THE INVENTION

This invention relates to the same field as the invention of my said patent. All the advantages and objects of the said patent are here present and the differences herein relate to the manner of securing the insert hereof to the top jaw herein. The machining of the parts of the present invention is simplified over that required in connection with the corresponding parts of my said patent. Also, the prior art to the present invention is believed to be the same as that of my prior patent and thus the following prior art patents are pertinent to some degree:

| PATENT NO. | DATE | PATENTEE | CLASS | SUB CLASS |
|---|---|---|---|---|
| 3,322,434 | 4-1967 | McClung et al. | 279 | 123 |
| 3,190,666 | 6-1965 | Testa | 279 | 123 |

SUMMARY OF THE INVENTION

In a summary way, this invention relates to a lathe chuck jaw assembly wherein the jaw chuck has spaced apart sidewalls which provide adjacent parallel sidewalls mounting surfaces. The end portions of the sidewalls at each end thereof are machined to provide end wall mounting wall surfaces which are normal to the sidewall mounting surfaces. Next, a T-shaped jaw insert is provided having a leg portion which has sidewalls which abut the sidewall mounting surfaces and the bottom of the T or cross member abuts, at its underside portion, the said end wall mounting surfaces. Next, set screws are carried by the sidewalls and engage a longitudinally extending groove extending transversely of the leg portion of the T-shaped jaw insert. Also, upon turning of the said set screws, the insert is urged so that the underside of the cross member abuts snugly against the end wall mounting surfaces carried by the sidewalls of the jaw.

BRIEF DESCRIPTION OF DRAWINGS

In addition to the objects of my invention which are set forth in said patent, other objects of my invention will become explicit as well as implicit as the description of my invention proceeds in connection with the following drawings, wherein like reference numerals indicate like parts and wherein:

FIG. 1 is an exploded, perspective view, with parts broken away, of a chuck of a lathe with my invention shown in association therewith;

FIG. 2 is a view partially in section and partially in elevation, taken substantially on broken line 2—2 of FIG. 1;

FIG. 3 is an exploded perspective view of a chuck jaw embodying my invention; and FIG. 4 is a perspective view of an insert blank embodied in my invention.

DESCRIPTION OF A PREFERRED EMBODIMENT

To illustrate my invention, I have shown in FIG. 1 of the drawings chuck mechanism more completely described in my said patent. Generally said mechanism comprises a chuck body 10 supporting a scroll plate 12 which is mounted for angular movement, which movement is accurately controlled in either direction by worm 29 meshing with ring gear 14 disposed on the underside of scroll plate 12. On the upper surface of scroll plate 12 are located spiral ridges 16. Between the ridges 16 are grooves into which ridges 18 of master jaws 20 project. In the form of the invention illustrated, I have shown master jaws 20 supporting top jaws 22 but it is to be expressly understood that my invention is not limited to top jaws unless the express working of the claims positively requires and that my invention is to be construed to cover jaws whether the same are in a single piece or whether the jaws are formed from master jaws and top jaws. In FIG. 1 also I have illustrated three master jaws 20 and three associated top jaws 22. In this connection the same is illustrative, as jaws used in connection with lathes often have more than three jaws and sometimes have two jaws.

Now referring to the master jaws 20, each has conventional means so a top jaw may be secured thereto, as a tongue 24, which extends radially of the chuck body, and a cross groove 26 mating grooves and tongues carried by each associated top jaw. Also, the scroll plate 12 is turned in one direction or the other in an adjusted amount by turning of worm 29 meshing with the ring gear 14, disposed on the under surface of the scroll plate 12.

Each of the top jaws 22 is provided with a radially extending groove 28 which mates with the radially extending tongue 24 of a master jaw 20 and also each of said top jaws 22 is provided with a transversely disposed tongue 30 which mates with a cross groove 26 carried by a master jaw 20. A top jaw 22 is further secured to each master jaw 20 by threaded stud bolts 32 and 34, each of which is commonly provided with a hexagonal opening 36 designed to receive therein an "Allen" wrench or tool.

Thus, I have described a conventional lathe chuck as an embodiment in which my invention may be used but it is to be understood that such conventional embodiment is only illustrative and is not a limitation. My invention relates to structure which is embodied in or carried by a top jaw or the top portion of a single jaw used in the place of a master jaw and a top jaw.

Each master jaw 20 is held against displacement in the chuck body by reason of its cross-sectional configuration and matching recesses in the chuck body in accordance with conventional practice. Also, the radial position of each master jaw 20 is determined by scroll plate 12 and worm 29, as previously described. Each of the top jaws 22 is provided with apertures 38 and 40 and the apertures 38 and 40 are provided with seats 42 and 44 (FIG. 2) against which the heads of the stud bolts 32 and 34 rest when the said stud bolts are tightened into the threaded portions in the master jaws 20. By the use of tongues and grooves as well as stud bolts, each top jaw 22 is held firmly against its associated master jaw 20 and with no movement between the said jaws.

Each top jaw 22 has an insert end portion 46 which is rather massive as compared to the opposite end portion of the top jaw and such end portion, when in use on a chuck, extends substantially in a direction axially of the chuck body 10. Spaced apart sidewalls 56 and 58 have inner, parallel mounting surfaces 52. The spaced, end mounting surfaces 48 are provided at one end portion of the sidewalls 56 and 58 and spaced, end mounting surfaces 54 are provided at the other end portion of such sidewalls. Mounting surfaces 52 are normal to surfaces 48 and 54.

Socket head screws 60 and 62 are carried by threaded openings in the sidewalls 56 and 58, and as shown, said socket heat set screws 60 and 62 are provided with hexagonal openings for the reception therein of an "Allen" wrench or tool. To secure an insert 64 in place, it is positioned with its sidewalls 66 against the sidewall surfaces 52,52 of the sidewalls 56 and 58 of top jaw 22. The bottom wall of the insert 64 is formed by two spaced apart surfaces 68, which are separated by arcuate surface 70 so that stud bolt 32 can readily pass thereby. The insert 64 has a top member 78 (said top member 78 forming, with the rest of the insert, a T-shape in cross section). The spaced, underside mounting surfaces 50 of the top member 78 are parallel with each other and normal to the insert sidewall 66. Upon seating of an insert 64 on a top jaw 22, the insert sidewall 66 seats upon top wall mounting surfaces 52 and the spaced under surfaces 50 of the insert top member 78 seat upon either top jaw mounting surfaces 48 when the insert is in one of its positions or upon the top jaw mounting surfaces 54 when the insert 64 is in the other of its mounting positions.

The insert 64 is provided with longitudinally extending grooves 72 disposed on opposite sides of the insert 64. After the socket head set screws 60 and 62 are turned so as to be noninterferring and the insert 64 has been inserted with its sidewalls 66 adjacent the sidewall surfaces 52 and so that its mounting surfaces 50 engage mounting surfaces 48, then the socket head set screws 60 and 62 are tightened to hold the insert 64 rigidly in place and to hold the insert by securing menas carried by the sidewalls 56 and 58 of a top jaw or the insert support end portion 46. Also, the securing means, as the socket head set screws 60 and 62, engage the jaw insert 64 at a plurality of locations spaced from each other and spaced in the direction of the axis of the chuck body 10.

In view of the arcuate portion 70, a stud bolt 32 can be inserted or removed at any time without the need of first removing an insert 64 and likewise, an insert 64 can be inserted or removed without in any wise interferring with the relative position of a stud bolt 32.

Sometimes it is desired to hold an insert, as insert 64, further away from the axial center of the chuck body 10 and when desired, the insert 64 may be held between sidewalls 56 and 58 with the sidewalls 66 of an insert 64 abutting spaced apart mounting surfaces 52 and with underside, mounting surfaces 50 abutting end mounting surfaces 54. This can be readily done and, if desired, additional socket head set screws 74 and 76 may be provided engaging an insert 64 at the area of the longitudinal groove 72.

When the parts are in the relative positions shown in FIGS. 1 to 3 of the drawings, the insert 64 has its sidewalls 66 and spaced under surfaces 50 positioned adjacent, respectively, the sidewall surfaces 52 and mounting surfaces 48 of the insert support portion 46. In such position, the insert 64 may be urged against to support the outside diameter of a work piece to be held in the jaws of the chuck or the surfaces 68 could be held against the internal diameter of a ringlike structure to be supported by the jaws of the chuck. Of course, where the surfaces 68 are used to support the internal surface of a ringlike object, then the insert 64 will have to be sufficiently long so that there will be substantial extension of the insert 64 beyond the sidewise dimension of the insert support portion 46 of top jaw 22. When the insert 64 has its sidewalls 66 and its spaced apart under surfaces 50 contacting, respectively, with the sidewall surfaces 52 and mounting surfaces 54 of the insert support end portion 46, then the surface 78 of the insert 64 will engage the internal surface of a ringlike object to be supported by the chuck jaws or the surfaces 68 of the insert 64 will engage the external diameter of a work piece to be supported by the jaws of the chuck body 10.

Also, the top jaws 22 may be reversed in their positions relative to the master jaws 20, so that the insert support end portion 46, instead of being in the position shown in FIGS. 1 to 3 of the drawings where the same is axially inwardly or the said top jaw may be reversed so that said insert support portion 46 is axially outward. Such capacity to change position permits the chuck to engage work pieces of greater variance in size dimensions over using the top jaw in only one position. A reversible top jaw has a very definite place in the chucking art.

Each top jaw 22 is provided with a transverse bore 80 to rotatively mount therein a shaft 82 on which is eccentrically mounted a wheel 84. A compression spring 86 is mounted in a recess 88 in the body of each top jaw 22 and spring loads the detent pin 90 to provide frictional resistance gainst the wheel 84 when the parts are assembled. In the assembly of the parts, the shaft 82 is inserted into the transverse bore 80 and urges the spring 86 into the recess 88 and thus spring loading the detent pin 90 against the internal surface of the wheel 84. In order to hold the said shaft in place, keeper 92 is inserted in an appropriately positioned groove in the periphery of the shaft 82. In order to turn the wheel 84 when desired, a hexagonal opening 94 is provided in the end portion thereof to receive an "Allen" wrench or tool. The adjacent sidewall of each top jaw 22 is cut away, preferably, so that the wheel 84 does not project unsightly from the sides of a top jaw 22. However, the distance between the inside of the wheel 84 and the center line of a top jaw 22 must be such that the wheel 84 will overlie the sides of the master jaw 20 as is best shown in FIG. 1 of the drawings. It is desired that the wheel 84 shall not in any wise engage the master jaw 20 and also that the top jaw 22 be reversible as previously indicated so that wheel 84 can project out from one side, or the other side, and will overlie without contacting the associated master jaw 20. It is desired that the peripheral surface of the wheel 84 be arranged so that the same can be rotated and thus brought into wedging contact with the adjacent surface of the chuck body 10, which is shown uppermost in FIG. 1 of the drawings.

In FIGS. 2 and 3, the wheel 84 bears opposite notations of "LOCK IN" and "LOCK OUT." Such notations are helpful but read accurately only when the parts are in the positions shown in the drawings. If a top jaw 22 is reversed in position, the notations will read opposite to the facts.

The inserts 64 form so-called "soft" jaws to be machined to precisely fit a work piece to be held by the chuck assembly. As shown in FIGS. 1 to 3, the top member 78 or the surface provided by the spaced apart surfaces 68 obviously will not precisely fit many articles and, of course, are not tailored to fit a particular object or work piece. Thus, in order to obtain the desired precision and to obtain the maximum benefit from the "soft" jaws provided by the inserts 64, it is necessary to machine either the top member 78 or the surfaces 68 to precisely the desired contour. Thus, cutters or other machining tools are employed after the jaws are set up and then the jaws, including the top jaws 22 are moved relatively inwardly or outwardly to provide an exact diameter to fit the said work piece. There is always a question of some slack where we have worms and ring gears and matters of that sort which are angularly moved. Thus, when the worm 29 is turned in the desired direction and in turn the scroll plate 12 is turned and in turn the master jaws, there will be a certain amount of slack in view of the fact that there will not be a work piece held between the various inserts 64 at the time that the desired surfaces thereof are turned to the desired diameter. Thus, we have one condition at the time of turning the said inserts to size and another condition at the time the said inserts are operative or are being used to hold a work piece in the chuck assembly.

In order to provide conditions where the said inserts 64 have faces thereof turned and the conditions are identically the same as when the said inserts are being used to grip a work piece, I provide the said wheel 84 and the mode of operation involved will not be here set forth, as the same is set forth in detail in my said patent.

In connection with FIGS. 1 to 3 of the drawings, when the insert 64 is held in a jaw, such as the top jaw 22, and the said top jaw is in the position shown in FIGS. 1 to 3 of the drawings so that the insert will engage the inner surface of a ringlike work piece, then it is desirable that the inserts extend beyond the body portion of the top jaw 22 to provide sufficient surface area to contact the work piece. Thus, it is desirable to have inserts which can be provided and which will have the desired length. Also, in addition it is desirable to manufacture inserts at a minimum cost and to have insert stock readily available to be tailored to fit inserts as needed. Thus, I have shown in FIG. 4 of the drawings an elongated piece of stock 96 which has been either milled to size and dimension or which has been extruded to dimension so that the only dimension not provided is that of length. Thus, the said stock 96 can be cut at desired lengths and the stock furnished very cheaply, as extrusions are not an expensive item and obviously, extrusions can be readily made for soft jaws. In other words, if the jaws are aluminum, nylon, soft steel, brass, phenolic, and many other materials, they can be readily extruded and, if necessary, the insert product can be machined to provide the desired cross-sectional area with the length indeterminate at the time of manufacture but to be determined by the user.

From the foregoing, it will now be apparent that I have provided a lathe chuck, jaw assembly comprising a jaw, as top jaw 22. This top jaw is provided with spaced apart sidewalls 56 and 58 having adjacent parallel sidewall mounting surfaces 52. The end portions of the sidewalls 56 and 58 provide spaced apart end wall mounting surfaces 48,48 and 54,54 which are normal to the mounting surfaces 52 of the sidewalls 56 and 58. A generally T-shaped insert 64 is provided having a cross or top member 78 and a leg portion. The leg portion provides sidewall 66 abutting the sidewall mounting surfaces 52. The cross top member 78 has underside mounting surfaces 50 which abut mounting surfaces 48,48 or 54,54 as desired. The leg portion or body of the insert 64 is provided with longitudinally extending grooves 72 on each side thereof. A plurality of set screws, as 60,60 and 62,62 for one set, or set screws 76,76 and 74,74 for the other set are carried by the jaw sidewalls 56 and 58 and such screws are movable into and out of engagement with the grooves 72. When the said screws are tightened they urge the insert 64 toward the top jaw 22 and urge the underside seating surfaces 50 toward either the mounting surfaces 48 or mounting surfaces 54. Then a set screw 60,60; 62,62; 76,76; and 74,74 will urge and hold an insert 64 precisely as respects a top jaw 22 when set screws are tightened and the insert is disposed at the appropriate end portion of the jaw.

Obviously, changes may be made in the forms, dimensions, and arrangements of the parts of my invention without departing from the principle thereof, the foregoing setting forth only a preferred form of embodiment of my invention.

I claim:

1. A jaw assembly comprising a jaw having spaced apart sidewalls defining facing planar surfaces the whole length of said sidewalls, associated end portions of said sidewalls providing mounting surfaces normal to said sidewalls, means for mounting said jaw on a chuck having an axis of rotation so that said mounting surfaces and said sidewalls are parallel to said axis of the chuck, a jaw insert having a leg portion which extends between said jaw sidewalls and provides wall portions closely abutting and fitting against said jaw only along said planar surfaces, and a head portion which provides an outerside work gripping surface and a spaced underside mounting surface normal to said jaw sidewall engaging wall portions of said leg portion and closely abutting and engaging said mounting surface of said jaw for positioning said insert and its outside work gripping surface relative to said jaw, and attaching means for detachably securing said jaw insert to said jaw with said spaced underside mounting surface of said head portion of said insert in tight positioning engagement only with and against said mounting surface of said jaw and with said leg portion in engagement only with and against said spaced apart jaw sidewalls planar surfaces.

2. The combination of claim 1 wherein said attaching means comprises screw means and surfaces of engagement on one and on the other respectively of said jaw and jaw insert elements whereby turning of the screw means into engagement with said surfaces of engagement urges said spaced underside mounting surface of said insert and said mounting surface of said jaw into solid positioning engagement.

3. The combination of claim 1, wherein both adjacent end portions at opposite ends of said sidewalls provide mounting surfaces for selective engagement with said underside mounting surface of said jaw insert.

4. The combination of claim 1 wherein each of said jaw sidewalls is a continuous surface extending between said mounting surfaces at said opposite ends of said sidewalls.

5. The combination of claim 2 wherein said screw means comprise set screws turned into threaded bores in said jaw sidewalls and said surfaces of engagement comprise a groove on each of said base wall portions of said jaw insert.

* * * * *